(12) United States Patent
Brown et al.

(10) Patent No.: US 9,582,949 B2
(45) Date of Patent: Feb. 28, 2017

(54) METHODS AND SYSTEMS FOR MANAGEMENT OF KEY EXCHANGES

(71) Applicant: Keycafe Inc., Vancouver (CA)

(72) Inventors: Clayton Carter Brown, Vancouver (CA); Jason Robert Crabb, Vancouver (CA)

(73) Assignee: KEYCAFE INC., Vancouver (CA)

(*) Notice: Subject to any disclaimer, the term of this patent is extended or adjusted under 35 U.S.C. 154(b) by 0 days.

(21) Appl. No.: 14/765,190

(22) PCT Filed: Jan. 15, 2014

(86) PCT No.: PCT/CA2014/050022
§ 371 (c)(1),
(2) Date: Jul. 31, 2015

(87) PCT Pub. No.: WO2014/124529
PCT Pub. Date: Aug. 21, 2014

(65) Prior Publication Data
US 2015/0371470 A1 Dec. 24, 2015

Related U.S. Application Data

(60) Provisional application No. 61/765,618, filed on Feb. 15, 2013.

(51) Int. Cl.
*G07C 9/00* (2006.01)
*H04W 4/02* (2009.01)
(Continued)

(52) U.S. Cl.
CPC ......... *G07C 9/00103* (2013.01); *G06Q 10/06* (2013.01); *G06Q 30/02* (2013.01);
(Continued)

(58) Field of Classification Search
CPC ............ G07C 9/00103; G07C 9/00896; G06Q 10/06; G06Q 30/02; H04L 63/061; H04W 4/023
See application file for complete search history.

(56) References Cited

U.S. PATENT DOCUMENTS 6,862,576 B1 3/2005 Turner et al.
6,961,711 B1 11/2005 Chee
(Continued)

FOREIGN PATENT DOCUMENTS

| CA | 2469699 A1 | 7/2003 |
|----|------------|--------|
| EP | 2375386 A2 | 10/2011 |
| WO | 03/088158 A1 | 10/2003 |

*Primary Examiner* — Leon Flores
(74) *Attorney, Agent, or Firm* — Oyen Wiggs Green & Mutala LLP

(57) ABSTRACT

Methods and systems for facilitating exchanges of keys between individuals across multiple locations are provided. Each key set is assigned a unique key identifier. The key identifier is encoded on a key chain attached to the key set. A key set is picked up or dropped off at a key exchange center and is scanned to read the key identifier. The key identifier is relayed to a key exchange server which tracks key locations. The key exchange server verifies that an individual is authorized to pick up a key set and provides instructions to a device at the key exchange center to enable access to the key set. The key exchange server coordinates drop-off of a key set by updating the key location associated with the key identifier at drop-off and providing instructions to a device at the key exchange center for storage of the key set.

59 Claims, 9 Drawing Sheets

(51) Int. Cl.
   *G06Q 10/06*    (2012.01)
   *G06Q 30/02*    (2012.01)
   *H04L 29/06*    (2006.01)

(52) U.S. Cl.
   CPC ........ *G07C 9/00896* (2013.01); *H04L 63/061*
   (2013.01); *H04W 4/023* (2013.01); *G07C*
   *2009/00936* (2013.01)

(56) References Cited

U.S. PATENT DOCUMENTS

| | | |
|---|---|---|
| 2003/0179075 A1 | 9/2003 | Greenman |
| 2004/0160304 A1 | 8/2004 | Mosgrove et al. |
| 2004/0254802 A1 | 12/2004 | Miller et al. |
| 2005/0110609 A1 | 5/2005 | Mosgrove et al. |
| 2005/0190037 A1 | 9/2005 | Shitan et al. |
| 2005/0241003 A1 | 10/2005 | Sweeney et al. |
| 2008/0186130 A1* | 8/2008 | Trevino ............. G07C 9/00896 340/5.2 |
| 2009/0027161 A1 | 1/2009 | Kent |
| 2009/0167488 A1 | 7/2009 | Hays et al. |
| 2010/0223170 A1 | 9/2010 | Bahar |
| 2012/0043139 A1 | 2/2012 | Eckerdt |
| 2012/0130916 A1 | 5/2012 | Neal et al. |
| 2013/0127594 A1* | 5/2013 | Sato ....................... A47G 29/10 340/5.73 |

* cited by examiner

METHODS AND SYSTEMS FOR MANAGEMENT OF KEY EXCHANGES

REFERENCE TO RELATED APPLICATIONS

This application claims priority from U.S. Application No. 61/765,618 filed on 15 Feb. 2013 and entitled METHODS AND SYSTEMS FOR MANAGEMENT OF KEY EXCHANGES. For purposes of the United States, this application claims the benefit under 35 U.S.C. §119 of U.S. Application No. 61/765,618 filed on 15 Feb. 2013 and entitled METHODS AND SYSTEMS FOR MANAGEMENT OF KEY EXCHANGES which is hereby incorporated herein by reference for all purposes.

TECHNICAL FIELD

The technology described herein relates to methods and systems for handling the exchanges of keys.

BACKGROUND

It is often necessary to provide one or more individuals with access to a locked property. For example, guests who have arranged for accommodation within the property may require access. Family, friends, property managers, couriers, delivery persons or service providers (such as, for example, cleaners, dog walkers, contractors, realtors, florists, etc.) may also require access. People may also require access to vehicles, storage units, or other types of property that is locked. It can be difficult to provide an individual with access to a property if the person who holds the keys to the property is unavailable to meet the individual to let him or her into the property.

Sometimes a key is hidden outside the property and the individual requiring access is provided with instructions for locating the key. In some cases the key is stored in a lock box outside the building. Typically the lock box has a keypad lock. A lock box is subject to security concerns, since any individual who has the pin code for the lockbox can open the lock box to retrieve the key at any time. In addition, lock boxes can be unfeasible for multi-unit properties, such as condominiums, which typically require a separate key fob, access card or building key to enter the building.

Sometimes a key can be given to a neighbour or other third party who is available to meet the individual to let him or her into the property. This solution relies on there being a person available to meet the individual at a specific location at a specific time. The logistics of coordinating such an event can be burdensome, especially since an individual's time of arrival may not always be predictable.

There is a general desire for methods and systems that address the aforementioned problems. In particular, there is a desire for methods and systems for providing an individual with access to a key or set of keys. There is a desire for methods and systems that are convenient to use to provide access to properties in urban areas including multi-unit structures, vehicles, storage units and other properties requiring keys.

The foregoing examples of the related art and limitations related thereto are intended to be illustrative and not exclusive. Other limitations of the related art will become apparent to those of skill in the art upon a reading of the specification and a study of the drawings.

SUMMARY

The technology described herein has a number of aspects. These include, without limitation: methods for exchanging keys for access to properties, computer systems for coordinating the supplying of keys to individuals, apparatus for storing and making available keys, and systems for facilitating the supply of keys to individuals.

One aspect provides a method of facilitating exchange of a key at a key access location. The method may be 'asynchronous' meaning that preparatory steps to make the key available to an individual at the key access location do not need to occur at the same time that the individual obtains access to the key. The method includes scanning to obtain a unique key identifier encoded on the key or a device attached to the key; identifying the key access location; assigning the key to a bin at the key access location; and associating the bin and the key access location with the identifier. An access rule for the key is received from an administrative user, wherein the access rule identifies an authorized party and an authorized access period. The key access location is published to the authorized party. An access request for the key is received from the authorized party through the client device, the access request providing user credentials. The access request is authenticated by verifying the user credentials provided in the access request against a set of credentials associated with the authorized party, comparing the time of the access request with the authorized access period. Authentication may additionally comprise comparing an identified location of the individual with the key access location associated with the identifier. If the access request is authenticated, an access instruction for presentation of the key is transmitted.

Another aspect provides for verification of a key being presented by receiving an identifier from a scanner (e.g. on a client device or in a key storage device) scanning the key at the key access location.

Other aspects provide systems for implementing the above-described methods.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
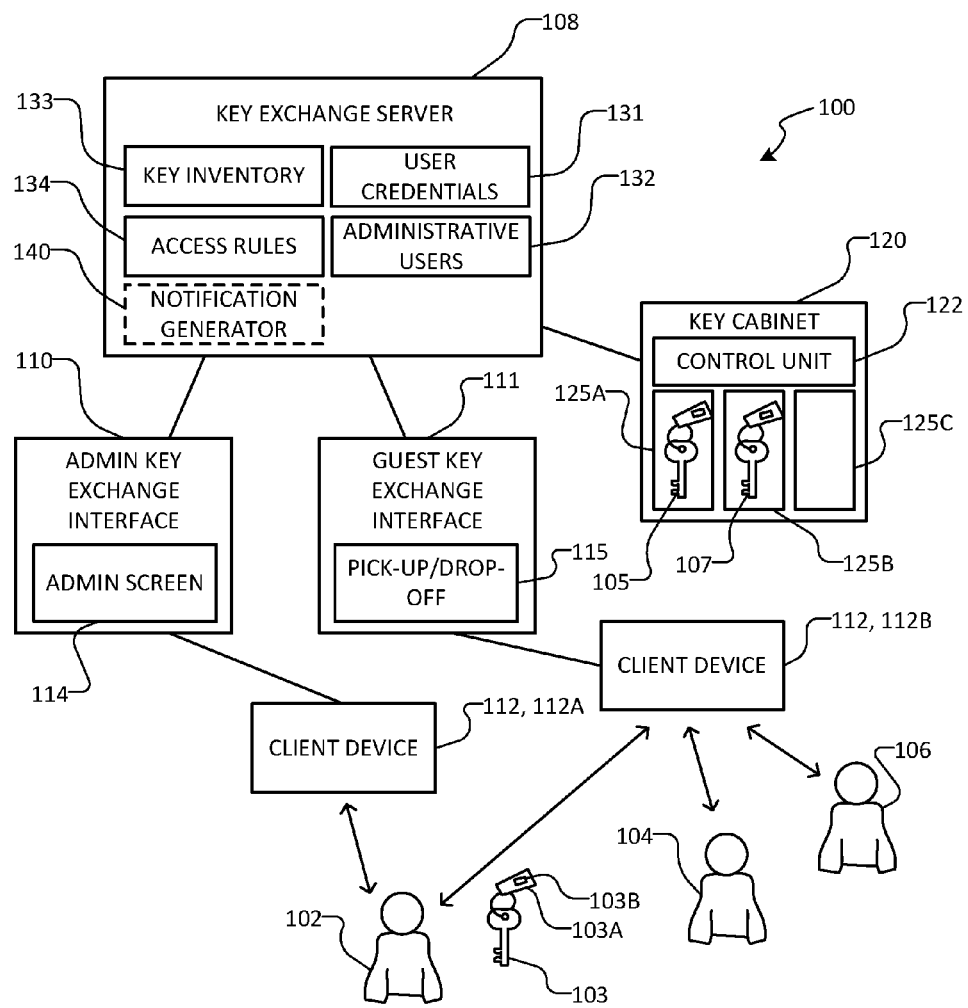
FIG. 1 schematically depicts the components of a system for handling key exchanges between individuals according to one embodiment.

Throughout the following description, details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

In embodiments described herein, key exchange systems and methods are provided for facilitating the exchanges of keys between individuals across multiple locations in a key exchange network. As used herein, "property" refers to any locked real estate, storage, commercial, vehicular or other property a person may wish to grant or gain access to. As used herein, "key" or "keys" refers to any instrument or device or set thereof that can be used to operate one or more locks to access a property. Keys include, for example, house keys, key fobs, key cards, car keys, digital or mobile devices that can be used to unlock or lock one or more locks, and the like. A 'key set' is a set of one or more keys that is directly or indirectly associated with a key identifier. A single key is an example of a key set. The key identifier is ideally unique. A key set may include keys to one or more properties (e.g. a set of keys may include a key to access a building, a key to access an apartment in the building and a car key).

A key exchange system includes key exchange locations at which one or more sets of keys is held for access by authorized individuals. A computer system keeps track of sets of keys being held at the key exchange locations as well as rules which determine when and to whom a set of keys may be released. The computer system may perform steps to authenticate individuals who seek to receive sets of keys.

The following is a non-limiting example of how such a system may be used. Consider the case where an owner has an apartment to rent out to travellers for a few days at a time. Instead of arranging to meet a traveller at a specific place and time to hand over keys to the apartment, the owner checks a set of keys for the apartment into a key exchange location where they are securely stored. When the keys are dropped off at the key exchange location, one or more steps may be taken to verify the keys. The owner also provides a computer system of the key exchange system with information identifying the traveller and a rule specifying when the traveller is entitled to receive the set of keys. These steps may be taken at the owner's convenience at any time in advance of the traveller's arrival.

At an appropriate time, the key exchange system may automatically notify the traveller of the whereabouts of the key exchange location. The key exchange location may be, for example, hosted in a business such as a café local to the apartment. Within the permitted time, the traveller can claim the set of keys from the key exchange location and can then access the apartment. As described below, authentication of the traveller and release of the set of keys for the apartment may be automated to various degrees. The traveller can eventually check the set of keys back into the key exchange location.

It can be appreciated that a system as described in the above non-limiting example has the advantage that keys for an apartment or other property can be exchanged without the need for a face-to-face meeting between the owner and the traveller. Further, such a system can optionally manage payment for use of the apartment or other property in a manner that does not require the owner to have access to the traveller's credit card or other payment information. In some embodiments, the owner and traveller can interact with the system by way of network-connected portable devices such as smart phones, tablet computers or the like. Such systems can be very easy to use by both owner and traveller while providing each with desired security.

Preferably the key identifier is machine-readable. In particular embodiments, the key identifier is encoded on or embedded within a key or a device that is physically attached to the key or to a set of keys, for example by a keychain. A 'key token' is a physical structure that can be scanned to read a key identifier. The key token may be readable using any suitable technology. For example, the key token may comprise a near field communication ('NFC') tag, an optically scannable bar code (such as a UPC code, QR code, or the like), a series of symbols (e.g. characters, numbers and/or other symbols) marked on the key or on a tag attached to the key, a Bluetooth token, or the like. Ideally each key set has no human-readable indicia that would permit an unauthorized party to associate the key set with the property that it belongs to.

In one useful and novel embodiment, the key token is provided in a keychain. The keychain comprises a metal fob and a chain or other attachment for coupling the fob to the keys of a key set. The fob comprises an NFC tag embedded in a non-metallic material within a recess in the metal of the fob. For example, the NFC tag may be adhered in the recess by an adhesive layer that contains an isolation layer that allows reading of the NFC tag despite the nearby presence of metal. NFC tags that include such isolation layers are marketed as 'anti-metal' NFC tags. The tag may be covered by a layer of plastic, epoxy or the like. The presence of metal near an NFC tag typically interferes with reliably scanning the NFC tag. However, it has been found that an NFC tag embedded in a recess as described above can be reliably read by an NFC scanner located close to the NFC tag over the recess.

An example keychain 400 is shown in FIGS. 7A through 7D. Keychain 400 has a metal fob 402 having a recess 404 on one face thereof. An NFC tag 406 is affixed in recess 404 with an isolating layer 408 between tag 406 and the metal body of fob 402. A layer 410 of epoxy, plastic or the like covers tag 406. A logo, corporate name or other indicia 412 may be marked on fob 402. A unique serial number or other unique human-readable identification information 414 may be marked on fob 402.

The NFC tag may be encoded with a unique URL as the key identifier. A unique serial number (or keychain name) may be printed on the NFC tag or keychain during the encoding or manufacturing process. The serial number may be linked to the unique URL in a computer system being used to manage key exchanges (e.g. a key exchange server database as discussed below).

The use of such key fobs in a key exchange system has various advantages including: 1) The metal fob can be sufficiently durable for a key exchange system that requires continuous use and transfer of the keys between parties and physical contact with hard walls of storage bins—most surfaces of the fob that might come into contact with other surfaces or objects are durable metal; 2) the metal keychain may be shaped to cooperate with specific key holding devices—in some embodiments the metal may comprise a magnetic metal and the key holding device may hold the keychain in a storage location in whole or part by magnetism; 3) securing an anti-metal NFC tag with non-metallic materials in a recess in a metal fob enables using the NFC tag with such a metal fob; 4) an NFC tag enables the keychain and key identifier to be detected by smartphones, enabling interactivity with client devices and mass distribution of the key exchange system; 5) the embedding of a URL as the key identifier, combined with NFC tags' smartphone interactivity, enables extensive informational and marketing possibilities to assist mass distribution of the system; and 6) the inclusion of a linked serial number (or name) enables users to visibly differentiate between multiple key sets chains and identify a desired key set even if a scanner is not available.

The key exchange system includes a computer system that has authorized users. Users may be authenticated to the computer system in any suitable manner. For example, the users may log onto the computer system using user name/password authentication. Any suitable authentication methods may be used. Different users may have different rights in relation to any particular set of keys. One user (e.g. a property owner or property manager) may have administrative rights in relation to a particular set of keys (that user may be called a 'key administrator'). The administrative rights may permit the key administrator to authorize access to that set of keys by others.

The computer system maintains a database that keeps track of key sets and permissions associated with key sets by key administrators. Such a database may be implemented in a wide range of different ways. For example, in one embodiment, each key set is associated with a property and access rights granted by a key administrator are associated with the property. In such embodiments the access rights are associated indirectly with the key sets. In other embodiments, the database is structured such that access rights are directly associated with each key set (by way of the key identifier). In either case, the key administrator can add access rules that indicate conditions for releasing a key set that is being held at a key exchange location. The key administrator typically has rights to add/modify and delete such access rules. Whatever form the rules take and whatever particular arrangement is selected for the database, the computer system is configured to, given a key identifier from a key token associated with a key set, access the rules that are associated directly or indirectly with that key identifier and determine based on the rules whether or not a particular individual is entitled to have access to the key set.

For the convenience of the key administrator the system may permit the key administrator to associate names with different properties and/or different key sets. For example, where the property is an apartment in Geneva the key administrator may opt to associate the name 'Geneva apartment' with the property and/or its key sets, where the property is a boat the key administrator may opt to associate the name 'boat' with the property and/or its key sets.

The physical transfer of keys from one individual to another is carried out at key exchange centers or key access locations. A key exchange center may be located at any place where it may be convenient to drop off and pick up keys. For example, key exchange centers may be in café s or coffee shops, restaurants, convenience stores, lobbies, shopping centers, airports, public transit hubs, marinas, parking garages, parking lots, and the like.

In some embodiments, each key exchange center comprises a scanner capable of reading key tokens. The scanner may be incorporated into a key storage apparatus or provided separately by a suitably-equipped network-connected computer or hand-held device. At each of the key exchange centers, the key tokens are scanned upon drop-off and pick-up of key sets. Scanning a key token reads the key identifier. The key identifier can then be relayed from the key exchange center to a key exchange server which tracks the location of all key sets in the key exchange network.

The key exchange server may verify whether each key set is at its expected location. The key exchange server may also verify whether an individual at a key exchange center is authorized to pick up a key set. If an access request is made and it is determined that the individual is authorized to pick up the key set, the key exchange server provides instructions to a device at the key exchange center to enable the authorized individual to have access to the key set. The key exchange server may also coordinate the drop-off of a key set at a key exchange center by receiving the key identifier of a scanned token and then providing instructions to a device at the key exchange center for storage of the key set and updating the key location associated with the keys in the server.

FIG. 1 illustrates an example system 100 for handling exchanges of key sets between individuals in a key exchange network. Representative individuals 102, 104 and 106 and representative keys 103, 105 and 107 are shown in FIG. 1. For purposes of the explanation herein, individual 102 is an administrative user having privileges to assign access rights for one or more key sets. Individuals 104, 106 are guest users who may be granted access to one of the key sets by an administrative user such as individual 102. User 102 may optionally be a guest user with respect to other key sets.

System 100 includes a key exchange server 108 which is configured to track the locations of the key sets and to manage and coordinate key transfers between individuals, such as between administrative user 102 and one or more of the guest users 104, 106. Administrative user 102 may communicate with key exchange server 108 to grant access rights for a key set. Guest users 104, 106 may communicate with key exchange server 108 to request access to a key set. Interactions between individuals 102, 104 and 106 and the key exchange server 108 may be handled through key exchange interfaces displayed on client devices 112 used by the individuals. A client device can be any device configured to communicate with key exchange server 108. A client device may, for example, comprise a personal computer, a terminal, a kiosk, or a network-connected controller integrated with a key cabinet or other apparatus. In some cases client devices may comprise mobile devices such as tablet computers, laptop computers, smart phones, or the like. In a particular embodiment, all users may have the same type of account and utilize a single integrated interface, but within the interface have administrative privileges in relation to some key sets and only guest privileges in relation to some other key sets.

To enable key exchange server 108 to track the locations of the key sets and manage access rights assigned to the key sets, a unique key identifier is assigned to each key set in the key exchange network. The key identifier may be encoded in a key token. For example, in the FIG. 1 embodiment, key 103's unique key identifier may be encoded in an NFC (Near Field Communication) tag 103B on a key chain 103A attached to key 103. While only one representative key 103 is shown attached to key chain 103A in FIG. 1, it is to be understood that multiple keys may be attached to chain 103A. For example, if the property is a condominium unit, all of the keys necessary to gain access to the unit, such as a key fob for the common properties and house key to the unit, may be attached to key chain 103A. In some embodiments where key sets include multiple keys a token may optionally be attached to or embedded in each key so that the system can verify that all keys that ought to be part of the key set are present.

Suppose administrative user 102 has the privileges to control access rights to key set 103. If administrative user 102 wishes to transfer his key set 103 to guest user 104, for example, he may grant access rights to guest user 104 by communicating these access rights to key exchange server 108. The access rights may include restrictions on access, such as a time period during which the guest user 104 is permitted to have access to key set 103. Key exchange server 108 includes an access rules database 134 which stores the access rules assigned to key sets by key administrators. Each access rule may be linked to a particular key identifier (either directly or indirectly) and to an authorized user.

Administrative user 102 may communicate the access rights to key exchange server 108 through an administrative key exchange interface 110 provided on a client device 112A used by administrative user 102. Client device 112A may be in communication with key exchange server 108 over the Internet.

If administrative user 102 has possession of key set 103, he or she can drop off key set 103 at a key exchange center so that it can later be picked up by the authorized guest user 104. The key exchange center may have a key cabinet or other key holding apparatus 120 for storing key sets as shown in FIG. 1. In particular embodiments, when key set 103 is dropped off at the key exchange center, its key token (e.g. key chain 103A) is scanned to read the encoded unique key identifier. Key 103 is placed in an available bin in key cabinet 120 (for example, bin 125C in FIG. 1). In some cases (such as where the key set has just been returned by a previous user to a key exchange center), key set 103 may already be located at a key exchange center and so the key drop-off is not necessary.

Once key set 103 has arrived at a key exchange center, key set 103's key identifier and key set 103's location (e.g. the key exchange center location and key bin number in which key set 103 is stored) are communicated to key exchange server 108. Key exchange server 108 maintains a key inventory database 133 which associates key identifiers with locations (and other information relevant to the key sets). Key exchange server 108 associates the location information with the key identifier for the key set being held at that location in the key inventory database 133. In some embodiments the key bin is designated by the key exchange server 108 (which can determine which key bins are available for example, by using key inventory database 133) and communicated to the key exchange center location.

Around the time at which guest user 104 is authorized to have access to key set 103 in accordance with the access rule set by administrative user 102, key exchange server 108 can automatically provide guest user 104 with a notification of the location of the key exchange center where key set 103 is being held. This notification may be provided in the form of an email, text message, voice message, message appearing in the guest user's key exchange account page, or the like. The notification may optionally contain additional information such as hours of operation of the key exchange location, directions for getting to the key exchange location and the like.

To obtain key set 103, guest user 104 may visit the key exchange center where key set 103 is located, and communicate his or her key pick-up request to key exchange server 108. This request may be communicated by guest user 104 to key exchange server 108 through a guest key exchange interface 111 provided on a client device 112B used by guest user 104. The guest user may be prompted to log in or provide other authentication information. Client device 112B may be in communication with key exchange server 108 over the Internet.

Based on the information provided for the key pick-up request, key exchange server 108 checks the access rules database 134 to verify that guest user 104 is authorized to have access to key set 103. If it is determined that guest user 104 is so authorized, key exchange server 108 relays an instruction to the key exchange center to enable guest user 104 to have access to key set 103. In some embodiments, this instruction comprises identification of the bin number identifying the specific bin in the key cabinet where key set 103 is stored. The bin number can be received on a client device 112 at the key exchange center. A person at the key exchange center having access to key cabinet 120, such as an employee at a business hosting the key exchange center may then open the appropriate bin and give key set 103 to the authorized guest user 104.

In some embodiments, particularly where the client device 112B used to request a key is a device not controlled by the operators of system 100 (e.g. where client device 112B is a tablet or cellular telephone of the guest user), key exchange server 108 may request location information from client device 112B. The location information may be, for example, provided by a GPS system of client device 122B. Key exchange server 108 may compare the location information received from the client device 112B to known coordinates of the key exchange location and may authorize release of the requested key set to the guest user only if the location information received from client device 112B matches closely enough the location of the key exchange location.

Prior to handing key set 103 to guest user 104, key set 103 may be scanned to read the key identifier and verify that the correct key set has been retrieved.

In some embodiments, key sets are stored in an automated key holding apparatus in which the release of key sets is controlled automatically. For example, the opening of bins or drawers in a key cabinet or other presentation of a key may be automated and controlled by a control and processing unit under direction of key exchange server 108. An automatically controlled key cabinet or kiosk may be installed in key exchange centers to handle key exchanges between users. In some embodiments an automatically controlled key cabinet is installed to manage key exchanges as part of an automated reception system to replace a staffed reception/concierge desk in a hostel, hotel or other facility which provides persons with access to keys.

In particular, the embodiment illustrated in FIG. 1 comprises a key cabinet having a control and processing unit 122 for controlling the opening and closing of drawers or doors to individual compartments or bins containing key sets (e.g. bins 125A, 125B, and 125C of FIG. 1).

Upon receiving an instruction from key exchange server 108, control and processing unit 122 causes a particular compartment door to open, or slides out a bin drawer, or releases a key set into a dispensing opening, or the like. Opening the bin drawer allows a key set stored in the bin to be picked up by a guest user, or allows a key set to be placed into the bin by an administrative user or other user. In another embodiment, the automated cabinet may have a single receptacle for the putting and taking of key sets by users to which the cabinet mechanically moves the relevant bins or key sets for presentation.

Client devices 112, including client devices 112A, 112B of FIG. 1, may include smart phones, mobile devices, personal computers, laptops, tablets or any other device (including custom-built computer terminals and kiosks) capable of connecting to the Internet and communicating with key exchange server 108. In some embodiments, client device 112B is incorporated in key cabinet 120 at the key exchange location.

Some of the steps described herein include scanning of a key token to read the key identifier. For example, as discussed above, key tokens are scanned during drop-off of the key sets at a key exchange center. Key tokens may also be scanned during pick-up of the key sets at a key exchange center. The key tokens may be scanned by a device capable of reading the encoded key identifier. In embodiments where the key identifier is encoded in an NFC tag on a key chain, the keys may be scanned by NFC-enabled devices, such as for example, NFC-enabled smart phones or tablets. The devices may be configured to run a key exchange application which transmits the key identifier to key exchange server 108.

FIG. 1's system 100 or portions thereof may be configured to implement one or more of the methods described herein. The methods are described in more detail below with reference to FIGS. 2 to 5.

Figure 2:
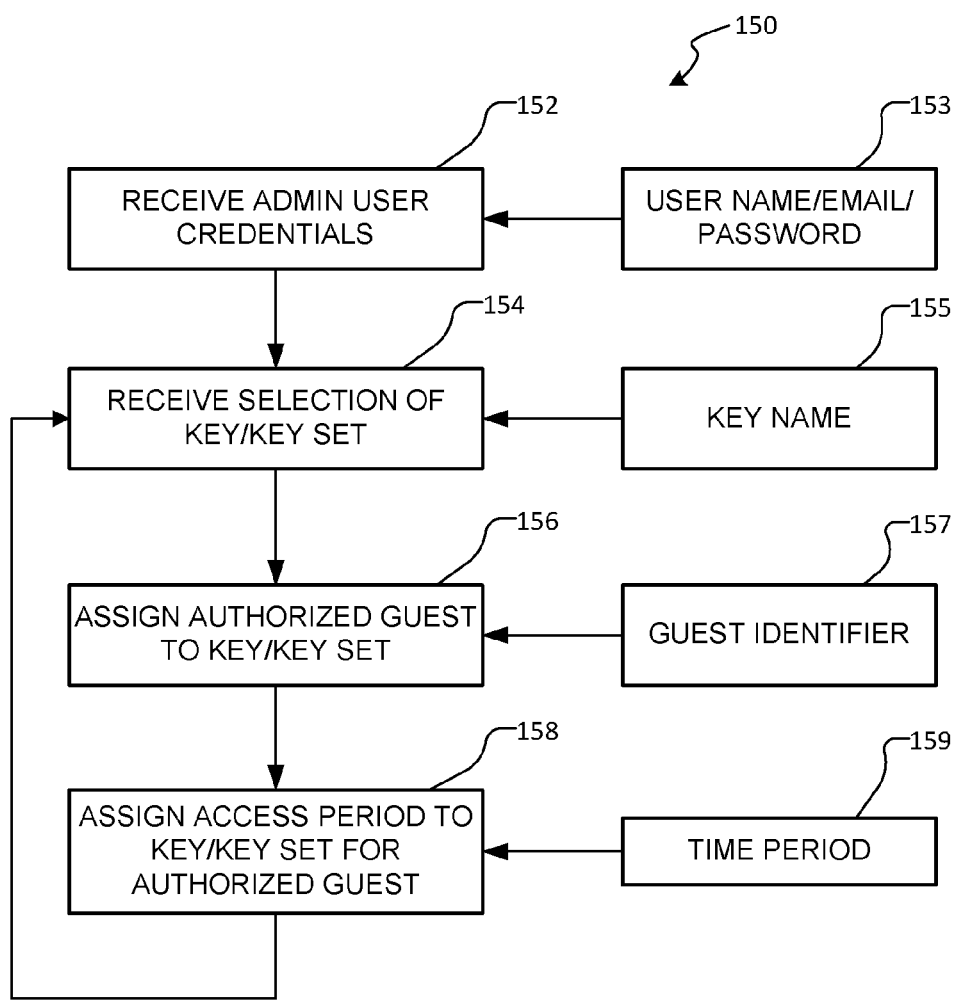
FIG. 2 is a flowchart illustrating a method for an administrative user to assign access rights to a key according to one embodiment.

FIG. 2 illustrates a method 150 for an administrative user to assign access rights to a key set according to one embodiment. For example, method 150 can be performed to enable administrative user 102 to grant guest user 104 access to key set 103 (FIG. 1). Method 150 can be repeated each time an administrative user wishes to create a new access rule for an individual. Method 150 may be implemented as software contained in a program memory accessible to a processor of the key exchange server 108 of FIG. 1. The processor implements the method by executing software instructions provided by the software. An administrative user can provide input to the software via the administrative key exchange interface 110 of FIG. 1.

Method 150 starts at block 152 by receiving an administrative user's credentials. Such credentials may include, for example, the user's account name, email and/or password 153 provided by the user. Such credentials may be provided by the administrative user at a login page to an account with the administrative key exchange interface 110 provided at client device 112A of FIG. 1. After the administrative user's credentials have been verified by key exchange server 108, the administrative user may be provided with access to his or her personal administrative page 114 (see FIG. 1) where he can view a list of the properties, keys and/or key identifiers (depending on the interface's representation) over which he has administrative privileges. The list may also indicate the current location of each key set (e.g. the key access location if the key set is being held at a key exchange center, or the last known whereabouts of the key set, if it has been picked up by a previous user). At block 154, key exchange server 108 receives the administrative user's selection from the list (e.g. a key name or identifier 155) that directly or indirectly identifies one or more key sets with which access rules will be directly or indirectly associated.

Method 150 proceeds to create an access rule for the selected key set(s) by receiving from the administrative user, at block 156, the identifier 157 of an authorized guest who may have access to the selected key set and, at block 158, details of the time period 159 during which the authorized guest may have access. The guest identifier 157 may be an email address, user account name, phone number, credit card information, name and address, or any other identifier which uniquely identifies users in the key exchange network. The time period 159 may indicate the day(s) and/or hour(s) during which the authorized guest will have access to the key set (e.g. the authorized guest has booked accommodation for one night and is granted access between February 7 at 3 pm and February 8 at 10 am). In some cases the time period 159 may include a recurring time period (e.g. the authorized guest is a cleaner who is authorized to have access to the key every second Monday between 12 pm and 4 pm) or the time period may be designated as unlimited. In some cases no specific access period may be specified (i.e. the guest user may be entitled to receive the key set any time after the key set has been checked in to a key access location.

Prior to assigning the authorized time period 159 at block 158, checks may be performed by key exchange server 108 to determine whether the time period 159 conflicts with previously assigned access rules for the key set. For example, a time period 159 may generate a warning or not be assigned if a different guest user has already been assigned access to the same key set for the same or an overlapping time period.

Once an access rule has been created at blocks 156 and 158, method 150 may be repeated by proceeding to block 154 if the administrative user wishes to create further access rules affecting the same or other key sets.

An administrative user can be assigned administrative privileges to a key set as identified by a key token and its key identifier at the time of acquisition. For example, a user who wishes to use the key exchange system in relation to a property may acquire a new key token (for example in the form of an NFC key chain). An NFC-enabled client device executing an application can be tapped to the key chain to cause the key identifier to be read from the NFC key chain and transmitted to key exchange server 108. The administrative user can provide his user credentials and request that he be assigned as the key administrator, through an interface on the client device. Key exchange server 108 can then update an administrative user's database 132 (see FIG. 1) to associate the administrative user with the key identifier.

Other methods could be used to associate the key identifier with the administrative user. For example, the user may enter a unique serial number visible on the key token into his account or the key exchange service may link the key identifier to the user's account prior to shipping or otherwise providing the key token. The key identifier can then be added to a list of key sets over which the administrative user has the privilege of adding access rules to or associating with a property or other data representation containing access rules in the user's account.

Figure 3:
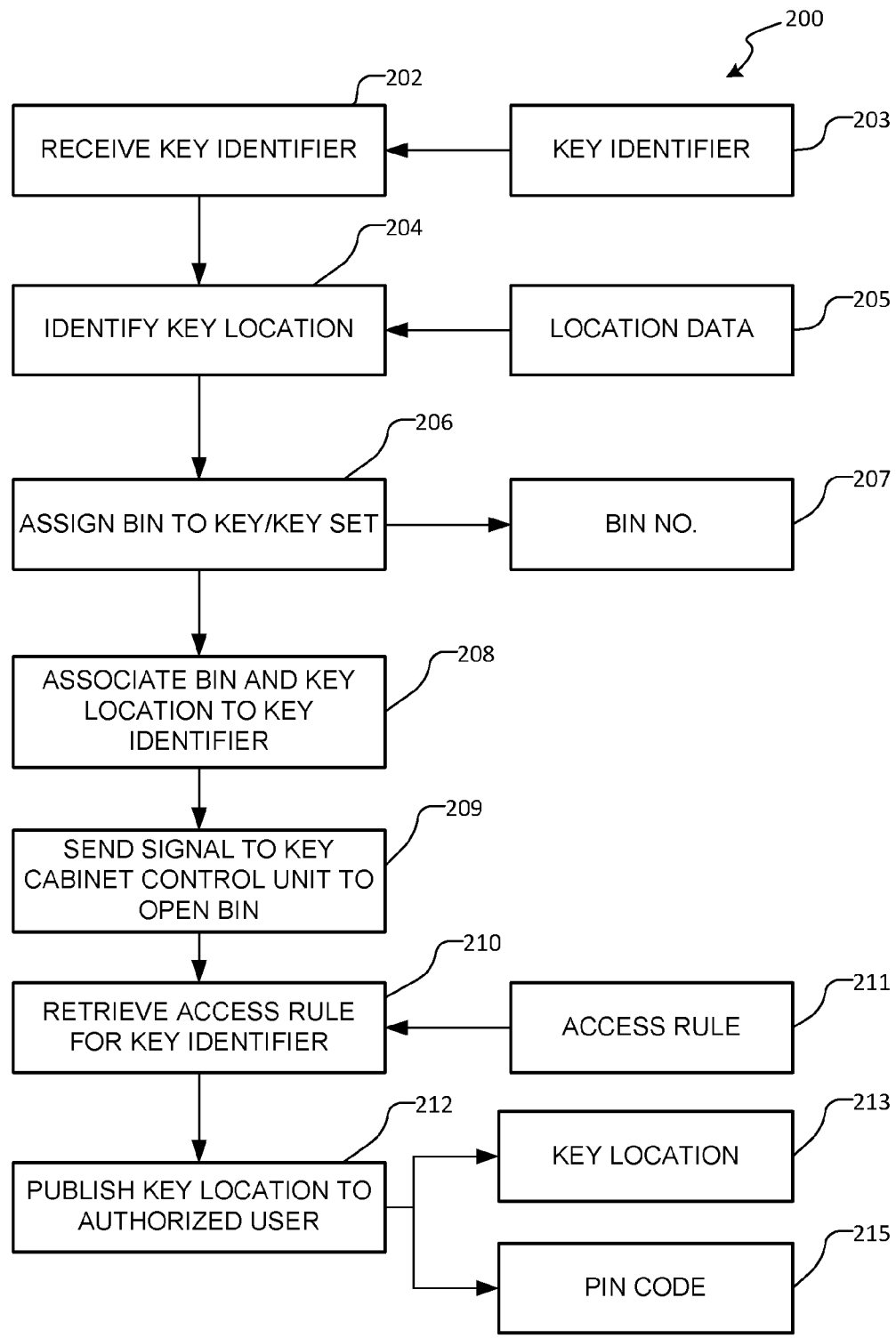
FIG. 3 is a flowchart illustrating a method that may be performed at key drop-off according to one embodiment.

FIG. 3 illustrates a method 200 that may be performed each time a key set is dropped off at a key exchange center. For example, method 200 can be performed when administrative user 102 drops off key set 103 at a key exchange center so that it can later be picked up by authorized guest user 104 (FIG. 1). Method 200 can also be performed when guest user 104 is returning/dropping off key set 103 at a key exchange center after he is done using the key set. Method 200 can be implemented as software contained in a program memory accessible to a processor of the key exchange server 108 of FIG. 1. The processor implements the method by executing software instructions provided by the software.

Method 200 is initiated by the scanning of a key token at a key exchange center. For example, when a user arrives at a key exchange center with a key set to drop-off, an NFC-enabled client device 112B may be tapped to a key chain containing a key token to read the key identifier encoded on a NFC tag. This key identifier may be transmitted by a key exchange application on the client device 112B to key exchange server 108. In some embodiments client device 112B may be any of: a client device specifically associated with the key exchange location (which may comprise a stand-alone device or a device such as a controller integrated into a key storage cabinet) or a portable device such as a tablet or smart phone of a user. Method 200 receives the key identifier 203 from the client device 112B at block 202.

At block 204, method 200 identifies the key location. This may be done in various ways. For example, method 200 may receive location data 205 from client device 112B and determine the key location (e.g. the key exchange center location) based on such data. Such location data 205 may include GPS data, mobile network location data, and/or user data input, or device identity data which key exchange server 108 can link to a location in its database and/or the like.

At block 206, a bin number 207 is assigned to the key, identifying an available bin in a key cabinet for storing the key. The assignment of bin numbers may be performed by key exchange server 108, control and processing unit 122, or a person may select an available bin for a key set being checked in. Where assignment of a bin is not done by key exchange server 108 the selected bin is communicated to key exchange server 108.

At block 208, the identified key location and assigned bin number are associated with the key identifier 203 that was received at block 202. At block 209, key exchange server 108 sends a signal to the control and processing unit 122 of key cabinet 120 to cause the assigned bin to open, so that the key set can be placed in the bin. In other embodiments where key cabinet 120 does not have a control and processing unit 122, the step at block 209 may be substituted with the step of transmitting the assigned bin number to a client device at the key exchange center, so that a person working at the key exchange center knows which bin to store the key in, or by the person working at the key exchange center placing a key in an open bin and that information being transmitted to the server through a bin sensor or by the worker through the client device interface.

In some embodiments, a key administrator may be prompted to provide optional instructions or other information to be released to a guest user either after the guest user picks up the key set or when the guest user becomes entitled to pick up the key set according to specified rules, for example. The information may comprise, for example, a map to the property associated with the key set, instructions for care of the property etc. In some embodiments the system provides a template for such instructions that includes information that may be available in the system such as the location of the property etc. In some embodiments the key administrator may have the option of storing a set of instructions for a property such that the system can automatically provide the same instructions to guest users of the property.

Method 200 proceeds to block 210 by retrieving any access rules 211 that have been directly or indirectly associated with the key identifier 203. If there is a user who has been granted access to the key set pursuant to one of the access rules 211 and the start of the authorized access period for the user is within a predetermined time (e.g. less than one day away), then method 200 proceeds by publishing the current key location 213 and any needed pickup instructions or codes 215 to the authorized user. Such pickup instructions or codes 215 may be generated by the system or the key administrator to authenticate the guest user upon key pickup.

In other embodiments, steps 210 and 212 of method 200 may be performed at other times. For example, key exchange server 208 may be configured so that it periodically reads or processes the access rules and publishes the current key location 213 of a key to an authorized user for which the start of an upcoming authorized access period is within a predetermined time. For example, key exchange server 208 may be configured to publish the current key location 213 and pickup instructions or codes 215 to an authorized user one day before the start of the authorized access period.

Figure 4:
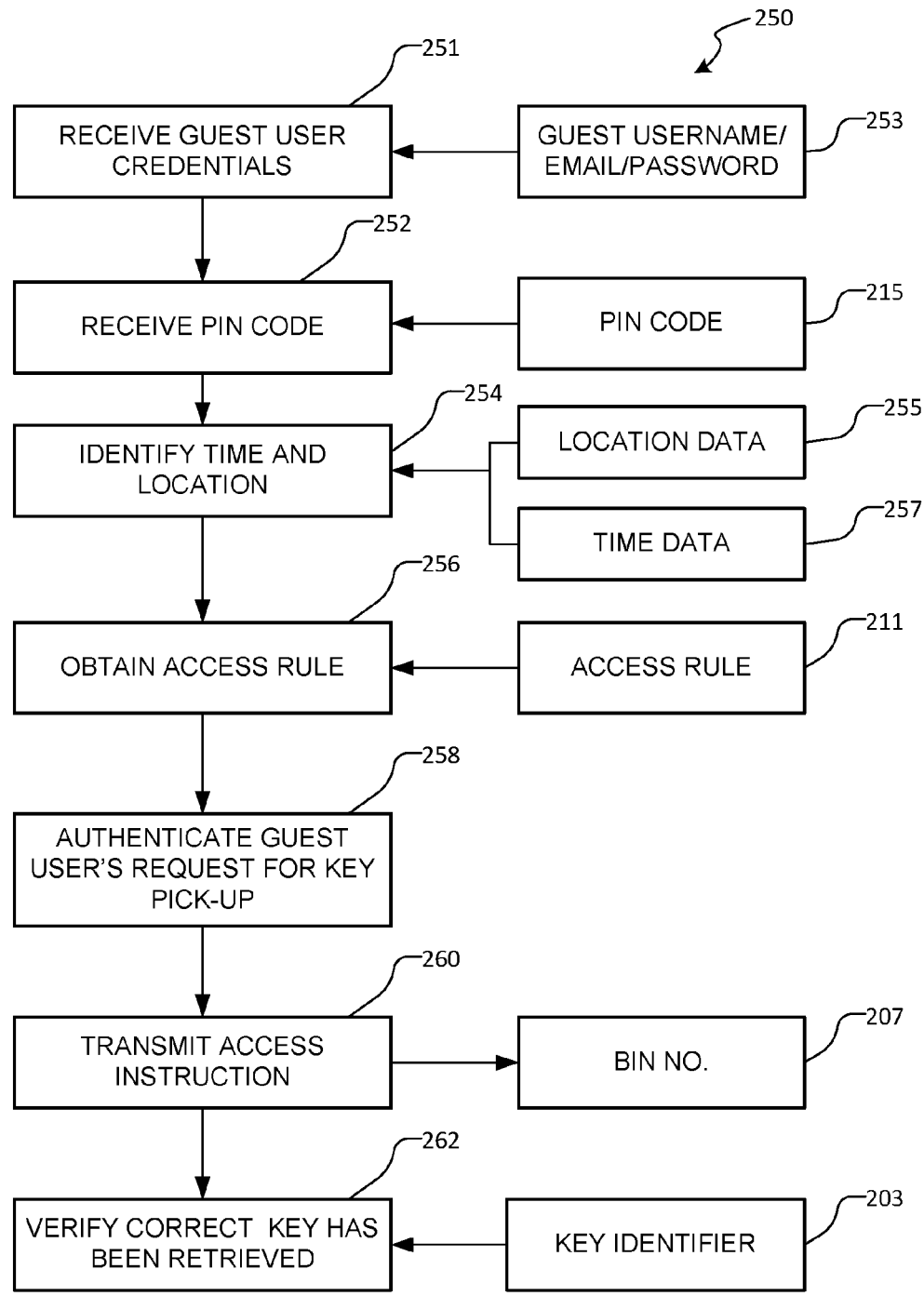
FIG. 4 is a flowchart illustrating a method that may be performed at key pick-up for providing an individual with access to a key according to one embodiment.

FIG. 4 illustrates a method 250 that may be performed at key pick-up for providing an individual with access to a key set according to one embodiment. For example, method 250 can be performed when guest user 104 arrives at the key exchange center to pick up key set 103 (FIG. 1). Method 250 can be implemented as software contained in a program memory accessible to a processor of the key exchange server 108 of FIG. 1. The processor implements the method by executing software instructions provided by the software.

Method 250 begins at block 251 by receiving a guest user's credentials 253. Such credentials may include, for example, the user's account name, email and/or password 253 provided by the user. Such credentials may be provided by the guest user at a login page of the guest key exchange interface 111 provided at client device 112B (FIG. 1). The credentials may additionally or alternatively include one or more of a PIN (such as a PIN provided with the access instructions or codes 215 at block 252), dual authentication through a mobile phone, or the presentation of a unique physical access token such as an NFC tag containing a unique identifier associated with the guest.

The input guest user's credentials 253 may be verified by the key exchange server 108 comparing them with a set of credentials associated with the user in user credentials database 131 (see FIG. 1). After verifying the guest user credentials, the guest user may be prompted to provide other access instructions or codes 215 at block 252. For example, the guest user may have been previously notified of a pick-up access code 215 for a key set at block 212 of method 200 (FIG. 3). The access code 215 may assist key exchange server 108 in determining which key set the guest user is requesting access to, as it is conceivable that the guest user may have access privileges for a number of different key sets at the key access location, for example, the guest user may be a cleaner who has access rights to keys to many different properties. If no additional access code 215 is required and it is unclear which key set at the key exchange center the guest may wish to access, the guest may be prompted to select one key set for the access event.

At block 254, method 250 identifies the time and location of the client device 112B at which the key access request is being made. The time of the key access request may be determined by the key exchange server 108 querying a source of timing information 257 accessible to the key exchange server 108, for example. The location of the client device may be identified by receiving location data 255 from the client device 112B and determining the client device location (e.g. the key exchange center location) based on such data. Such location data 255 may include GPS data from the client device 112B, mobile network location data from the client device 112B, user data input from the client device 112B, or device identity information from client device 112B which key exchange server 108 can link to a location in its database, or a physical presence verification achieved through a button, scanner or some other interaction with equipment at the key exchange location and/or the like.

At block 256, the relevant access rule 211 for the requested key that stipulates key access rights for the guest user is retrieved. At block 258, method 250 proceeds by authenticating the guest user's request. For example, at block 258 the time of the key access request can be compared with the authorized access period stipulated in the access rule to determine whether the key access request is properly made within the authorized access period. In addition, at block 258, the location of client device 112B determined at block 254 may be compared with the key access location associated with the key identifier for the requested key set. This can help determine whether the guest user is at the correct location to pick up the key set. If the key set is located elsewhere, or the key access request is being made outside of the authorized access period, then the key access request is denied.

If the key access request is authenticated, method 250 proceeds to block 260 by transmitting an access instruction to client device 112B. For example, in the illustrated embodiment, the access instruction includes the bin number 207 of the bin in which the key set is stored. The bin number 207 would have been previously associated with the key identifier of the requested key set at the time that the key set was dropped off (for example, as described with reference to block 208 of FIG. 3's method 200) or a more recent key inventory scan. A person at the key exchange center who has access to the key cabinet can use the access instruction provided at block 260 to open the bin to obtain the requested key set from the designated bin.

At block 262, method 250 verifies that the correct key set has been retrieved by receiving the key identifier 203 for the key set. For example, prior to handing the key set to the guest user, the person who has opened the bin to retrieve the key set may tap the key chain to an NFC-enabled client device 112B to read the key identifier encoded on the key chain's NFC tag. This key identifier may be transmitted by a key exchange application on the client device 112B to key exchange server 108. Key exchange server 108 may then verify whether the scanned key identifier corresponds to that of the requested key set.

Figure 5:
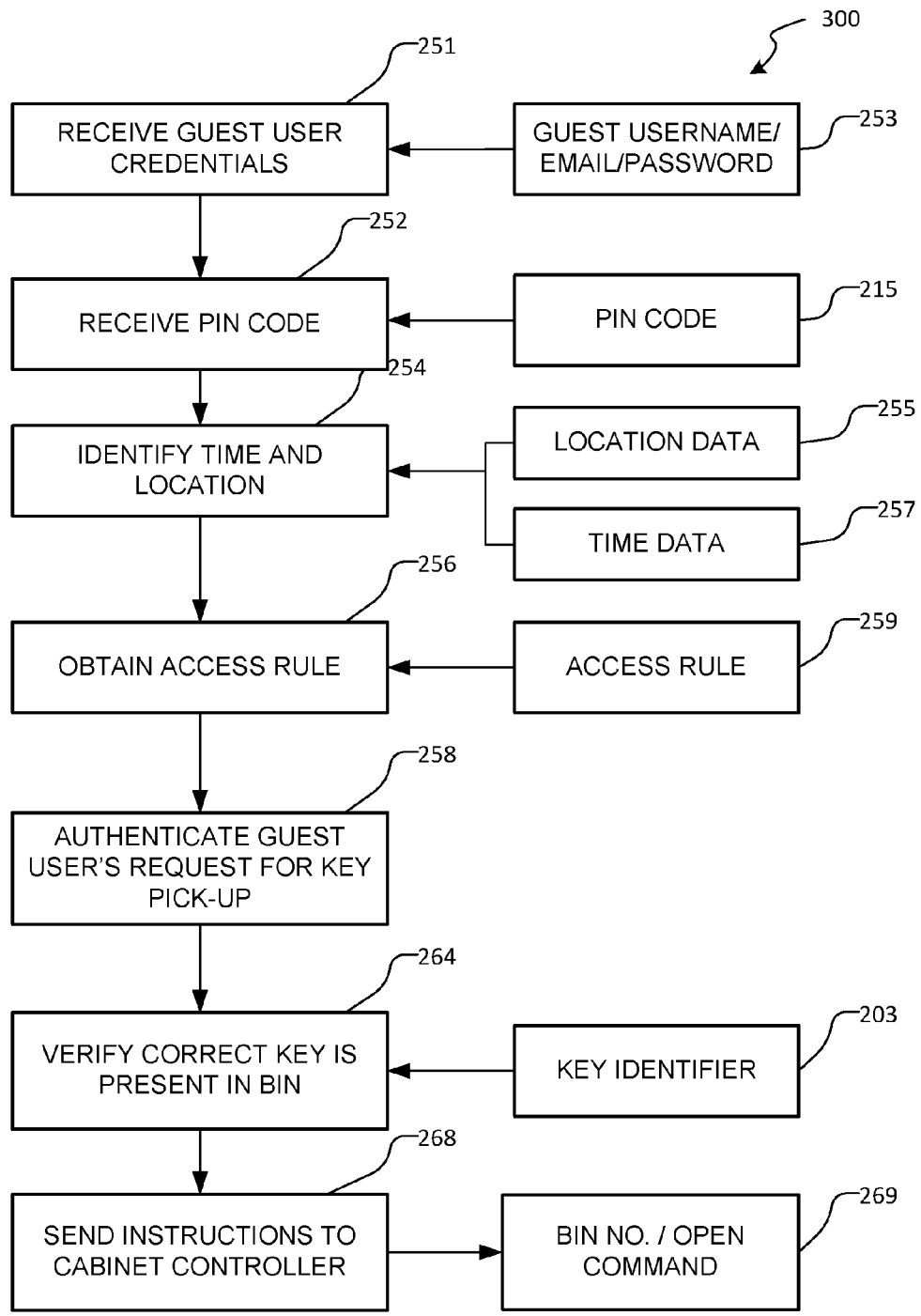
FIG. 5 is a flowchart illustrating a method that may be performed at key pick-up for providing an individual with access to a key according to another embodiment.

FIG. 5 illustrates a method 300 that may be performed at key pick-up for providing an individual with access to a key set according to another embodiment. For example, method 300 can be performed when guest user 104 arrives at the key exchange center to pick up key set 103 (FIG. 1). Method 300 is similar in some respects to method 250 of FIG. 4. Similar reference numerals are used to denote similar steps or components. Method 300 can be implemented as software contained in a program memory accessible to a processor of the key exchange server 108 of FIG. 1. The processor implements the method by executing software instructions provided by the software. Input can be provided to the software via a guest key exchange interface 111 displayed on a client device 112B (see FIG. 1).

Method 300 may be performed where the key cabinet has a control and processing unit 122 (FIG. 1) that controls access to key sets being held in the key cabinet (for example by the opening and closing of drawers or bins in the key cabinet). Control and processing unit 122 of key cabinet 120 may be in communication with key exchange server 208 over the Internet. Method 300 includes similar steps 251, 252, 254, 256 and 258 as method 200. However, method 300 differs from method 250 beginning at block 264 of method 300. Instead of transmitting an access instruction to a client device 112B (pursuant to block 260 of method 250), at block 264 method 300 verifies that the correct key set is present in the bin associated with the key's identifier. This verification step can be implemented by a scanner located in the key bin, which is capable of scanning the NFC tag on the key token contained in the bin. For example, key exchange server 208 may relay an instruction to key cabinet 120's control and processing unit 122 to activate the scanner to read the key identifier 203 of the key token in the identified bin (or all of the bins in key cabinet 120 in search of key identifier 203). The scanned key identifier is then relayed by the control and processing unit 122 to the key exchange server 208 for verification. If the correct key set is determined to be present in the bin, then at block 268, key exchange server 208 sends an instruction 269 to the control and processing unit 122 to open the bin containing the key set or otherwise make the key set accessible. In some embodiments the system automatically provides to the recipient of the key set (for example, by way of an email, text message or the like) additional information relevant to the key set (e.g. directions for getting to the property to which the key set belongs from the key exchange location).

The key verification steps at block 262 of method 250 and block 264 of method 300 can help to prevent the wrong key set from being given to the guest user. For example, a different key set from the requested key may have been accidentally placed in the bin, and the verification step will catch this error. The verification steps described above are not necessary for all embodiments. In certain embodiments, the verification steps are omitted, or are performed in some other way.

Key exchange server 108 may optionally implement one or more notification generators 140, shown in FIG. 1, that determine when one or more users, such as guest users and/or administrative users, receive notifications of one or more events. The notifications may be generated by key exchange server 108 and/or may consist of or incorporate information provided by a user (e.g. a key administrator may provide content to be included in one of more notifications provided to guest users—such content may be uploaded into or entered into key exchange server 108 from a client device by way of a user interface).

Notification generator may be configured to distribute one or more different notifications. Each notification may be associated with corresponding criteria. Notification generator 140 may be configured to search one or more databases of key access server 108 to identify cases for which notifications should be distributed. In some embodiments notification generator 104 is configured to search databases accessible by key exchange server 108 such as key inventory database 133 and rules database 134 to identify when notifications should be distributed and to whom. For example, notification generator 140 may automatically notify a key administrator when a guest user 104 has received a key set 103 from a bin 125.

As another non-limiting example, notification generator 140 may determine the earliest time at which guest user 104 may access key set 103 (from an access rule associated with the key set 103) and, when that time is near (e.g. when that time is 1 day away, several hours away, or some other duration away), may check to verify that a key set 103 to be exchanged is present at a key exchange location (e.g. in a bin 125 of a key holding apparatus 120). If key set 103 is present (e.g. as indicated by key inventory database 133) then notification generator 140 may automatically notify guest 103 that the key set will soon be accessible at the key exchange location where key set 103 is being held. If key set 103 is not present, then notification generator may notify the corresponding key administrator that key set 103 has not yet been placed in key holding apparatus 120 and may, in some embodiments, provide information or instructions to assist the key administrator in dropping off key set 103 at a key exchange location in time.

Notifications may, for example, be by email, text message, voice message, message appearing in the user's key exchange account page, and/or the like. Notification generator 140 may generate notifications at the same time that certain events occur, and/or may generate warning notifications in advance of such events occurring. For example, notification generator 140 may notify guest 104 in advance of the earliest availability of key set 103 is key set 103 has been placed in a bin 125 (as discussed above), or it may defer that notification until the moment that key set 103 is available. The following example uses the latter approach, but it may be adapted to provide notifications in advance of deadlines or other determined times.

Figure 9:
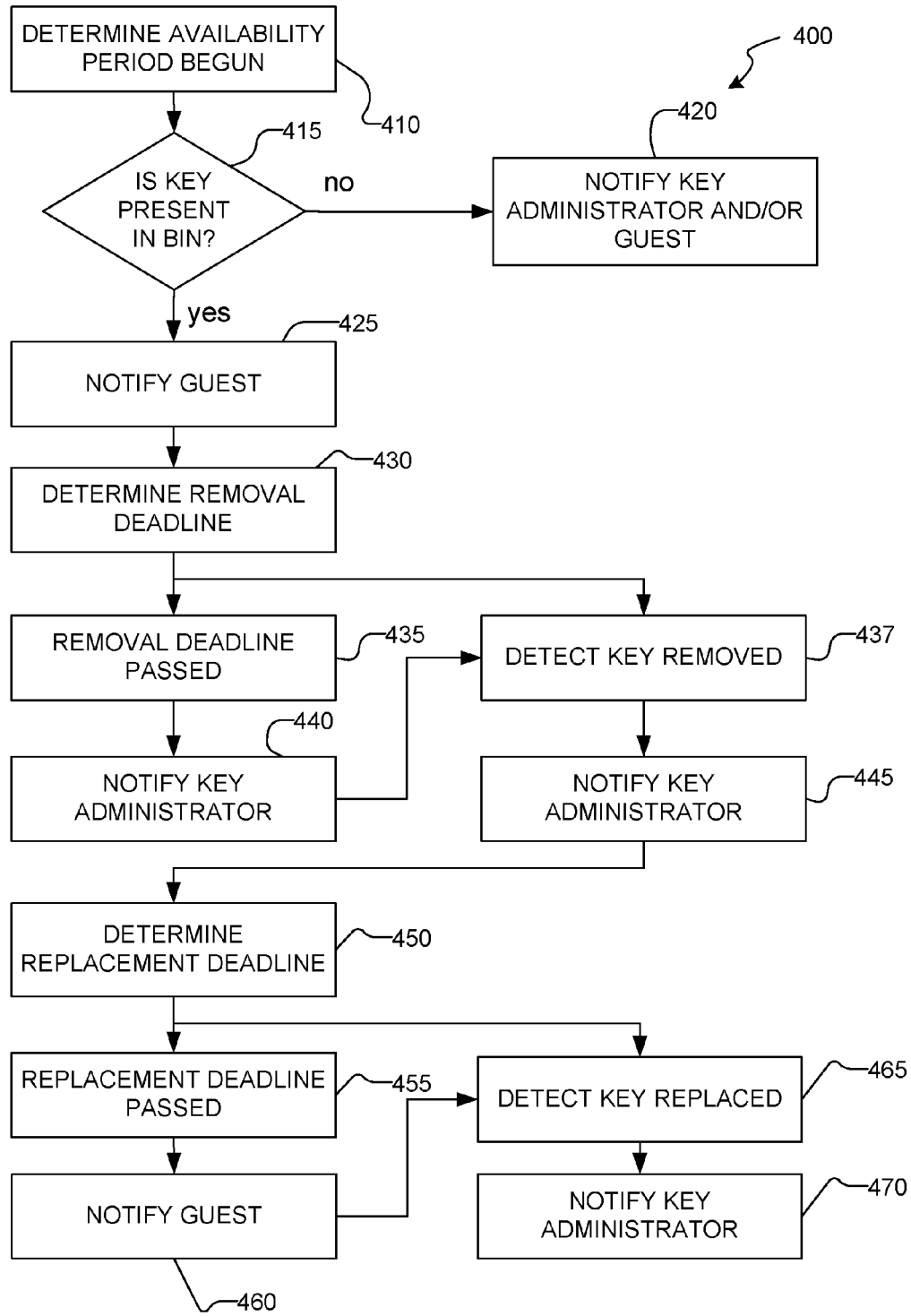
FIG. 9 shows an example method for notifying users.

FIG. 9 shows a non-limiting example notification scheduling method 400 that may be performed by a notification generator. In block 410, the notification generator determines a period of time during which a guest user 104 has permission to access a key set 103. This may be performed by checking access rules database 134 for time-based access restrictions. When that time period begins (i.e. when guest user 104 acquires permission to access key set 103), the notification generator proceeds to block 415 and determines whether key set 103 is present at a key exchange location (e.g. in a bin 125C in FIG. 1).

If key set 103 is not present, the notification generator goes to block 420 and sends a notification to the key administrator associated with key set 103 reminding them to deposit key set 103, guest user 104 informing them that key set 103 has not been deposited, or both, depending on the configuration of the notification generator. Otherwise, if key set 103 is present, the notification generator goes to block 425 and notifies guest user 104 that key set 103 has been deposited and is available for access.

From block 425, notification generator 140 proceeds to block 430, where the notification generator determines a time by which key set 103 is expected to be removed from the key exchange location. If, before that time occurs, key set 103 is provided to the guest user then the notification generator goes to block 437 and detects its removal, after which it goes to block 445 where it notifies the key administrator of that removal. If key set 103 is not removed before that time occurs, the notification generator goes to block 435 when the passage of time is detected, after which it goes to block 440 where it notifies the key administrator that key set 103 was not removed by the relevant time. If key set 103 is later removed, then notification generator 140 goes to block 437.

From block 445, the notification generator goes to block 450 where it determines a time by which key set 103 is scheduled to returned to a key exchange location by guest user 104. If, before that time occurs, key set 103 is checked into a key exchange location then the notification generator goes to block 465 and detects its return, after which it goes to block 470 where it notifies the key administrator of the return of key set 103. If key set 103 is not returned before that time occurs, the notification generator goes to block 455 when the passage of time is detected, after which it goes to block 460 where it notifies guest 104 that key set 103 was not removed by the relevant time. If key set 103 is later returned, notification generator 140 goes to block 465.

Notification generator 140, where provided may be implemented in software running on key exchange server 108, in hardware incorporated in or accessible to key exchange server 108, or in a mix of software and hardware. Notification generator 140 where provided may be integrated with other parts of key exchange server 108 or may be implemented as a distinct component or subsystem.

Figure 6A:
FIGS. 6A, 6B and 6C are exemplary screenshots of graphical user interfaces of a key exchange application according to one embodiment.
Figure 6B:
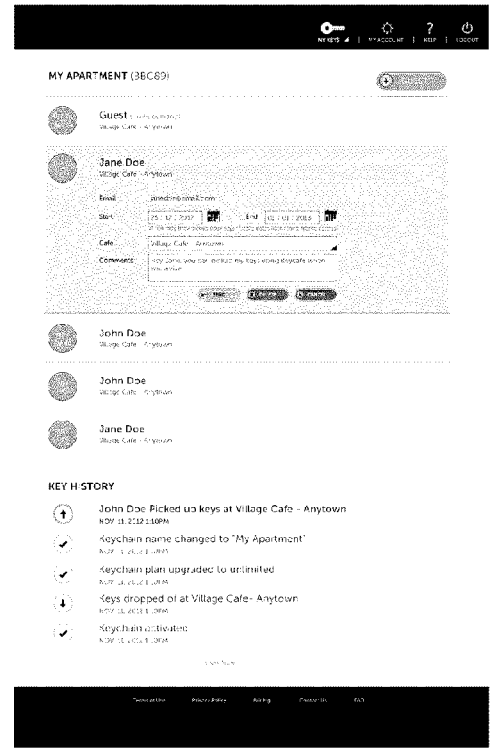
Figure 6C:
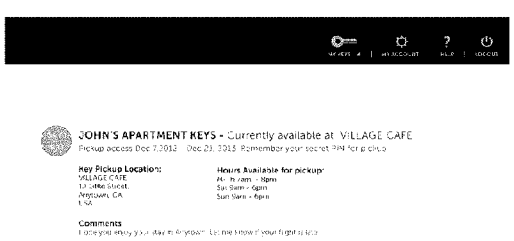
Figure 7A:
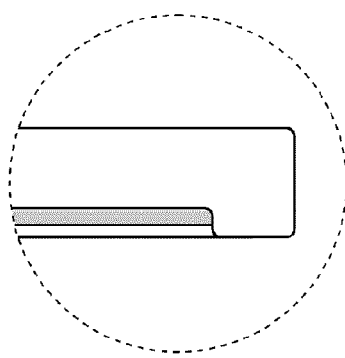
FIGS. 7A to 7D illustrate a key chain comprising a key token that may be used in some embodiments.
Figure 7B:
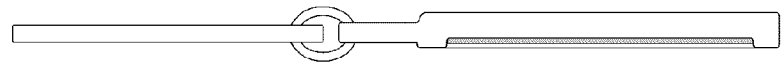
Figure 7C:
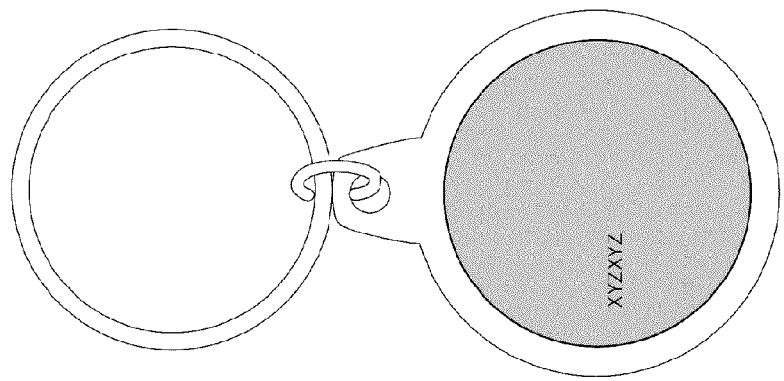
Figure 7D:
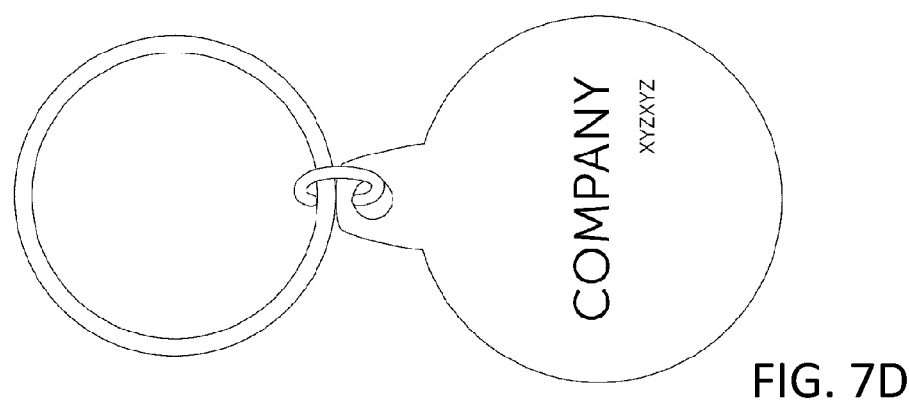

FIGS. 6A, 6A and 6B are screen shots of exemplary graphical user interfaces of a key exchange application according to one embodiment. FIG. 6A and FIG. 6B show example screens of an administrative key exchange interface that can be used by an administrative user to assign guest users with access rights to the administrative user's key sets. FIG. 6C shows an example screen of a guest user key exchange interface displaying a notification to a guest user that a requested key set is available for pick-up at a particular key exchange center.

A wide range of client computing devices may be used to assist with checking key sets in and out and otherwise interacting with key exchange server 108. For example, a NFC-enabled tablet or other similar device may be used for processing key pickup/drop offs. The device may contain an application which performs key exchange center functions such as scanning the tokens of key sets. The application may be authenticated to server 108 using credentials associated with an operator of the key exchange location. These credentials may be associated with a physical location of a key exchange location. Information such as a bin number for holding or retrieving a key set may be provided by way of the tablet or other device.

Figure 8:
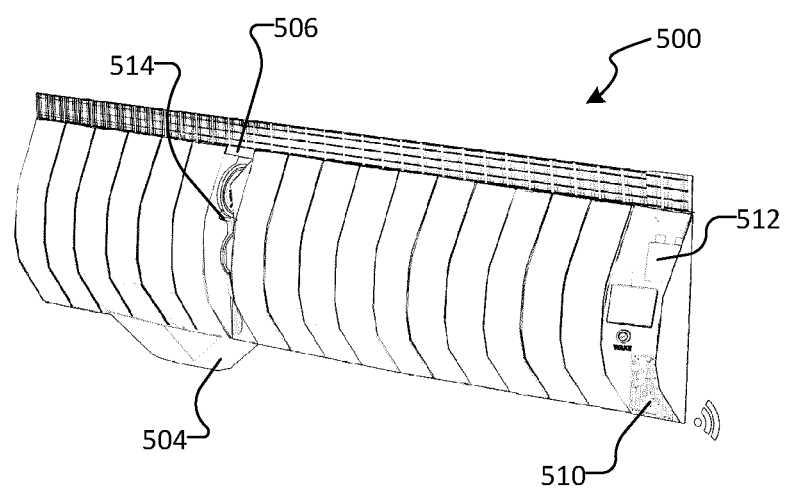
FIG. 8 shows an example cabinet for storing key sets.

FIG. 8 shows an example key storage cabinet 500 that may be provided at a key exchange location. Cabinet 500 comprises a plurality of bins 502 which, in this embodiment are each accessed by a separate door 504. Each of doors 504 may be locked closed by an electrically-controlled mechanism 506. A controller 510 is connected to mechanisms 506 and can therefore keep a door 504 locked or unlock a door 504 so that it can be opened by a user to place a key set into the corresponding bin 502 or to remove a key set from the bin 502.

Controller 510 has a wired or wireless network interface that permits it to communicate with a server (such as server 108, shown in FIG. 1) by way of the internet. By way of example, controller 510 may comprise a wireless network interface such as a WiFi interface or a cellular data interface. Key storage cabinet 500 comprises a power supply 512 for supplying electrical power to controller 510. In some embodiments the power supply connects to an external source such as mains electricity. In other embodiments the power supply comprises batteries and/or solar cells.

A scanner 514 for scanning key tokens is associated with each bin 502. Scanners 514 are in data communication with controller 510. In some embodiments, controller 510 comprises a user interface (not shown) that permits controller 510 to be used as a client device in communication with key exchange server 108 by a guest user to request release of a key set or by a key administrator to drop off a keyset. Storage cabinet 500 may comprise a display or other system for indicating a specific bin to a user. For example, a LCD display configured to display a bin number, an LED or LCD associated with each bin or the like.

As will be appreciated upon reading this description, the key exchange systems and methods described herein provide a number of benefits to property owners or property managers (or an occupant of a property). For example, the systems and methods provide a convenient way for a property owner or property manager (such as a real estate management firm) to provide one or more individuals with access to the keys to their property, without having to install a lock box, hide the key outside the property, or physically be on-site to meet the individual. The property owner or property manager can, through a client device such as a smart phone in communication with the key exchange server, control access rights for a number of successive visitors by restricting the time at which each individual can have access to the key. This may be useful where the property owner or property manager rents out the property to guests or needs to grant temporary access to certain visitors (e.g. contractors, cleaners, realtors, appraisers, etc.). In addition, using the systems and methods described herein, the property owner or property manager can grant access rights to multiple key sets to the same property. For example, the property owner or property manager may make one key set available to the current guest renting the property and another key set available to a cleaner of the property.

The key exchange systems and methods described herein also provide a number of benefits to guests or visitors to a property. For example, using these key exchange systems and methods, a guest who is renting a property does not need to coordinate his arrival time with the availability of his host. The guest can retrieve a key to a property at any time which is within the authorized access period and the key exchange center's operating hours. The key exchange systems and methods also provide a convenient way for the guest to return a key after he is finished with the visit.

Businesses acting as the key exchange centers (e.g. such as café s) may also benefit from the increased traffic to their businesses brought by users arriving to pick-up or drop-off key sets (in addition to the potential direct compensation that may be provided to the businesses by the operator/owner of the key exchange network in exchange for the business' services in hosting, managing or operating a key exchange center).

The value of such foot traffic could be enhanced by an embodiment in which the system is configured to support a loyalty program in which users may, each time they make a purchase at a business in the key exchange center network, accumulate credits or value in the key exchange system upon verification of the purchase and their identity to a client device. Such a loyalty program would encourage users of the key exchange program to be customers of businesses in the key exchange center network.

Systems as described herein are readily expandable. For example, a single key access server (e.g. 108) may serve a large number of key access locations. Some of these key access locations may be differently branded or differently presented to the public. In some embodiments different client software (for example software used by users to administer access rules for key sets or client software used at key exchange locations) may be different for different users. In such embodiments a server system 108 may administer key sets in a range of differently-branded key exchange locations. In some embodiments one or more key access servers 108 may be part of a network which services a number of key cabinets 120 or automated key exchange kiosks enrolled in the network across a plurality of key access locations. Key exchange server system may have an application programming interface (API) that permits programmers to write their own applications to access functions provided by key access server system 108. Such applications may include, for example: applications which provide customized interfaces to enable key cabinets 120 or automated key exchange kiosks to interface with key access server 108 and client devices to perform particular key exchange functions, and applications to monitor the status of key cabinets 120 or automated key exchange kiosks at the key access locations. Custom applications and updates thereto may be remotely pushed out to a key cabinet or automated key exchange kiosk.

As non-limiting examples, a rental car company may wish to utilize such an API to transition from a human staffing model to an automated key exchange system at rental car lots, a property management or booking company may wish to integrate with such an API to provide its customers access to its own branded key exchange centers distributed through a network of local business partnerships, a car sharing company may wish to utilize such an API to provide a car sharing option that utilizes car keys rather than installation of a new technology in the car, a building having a lobby or front desk/concierge may utilize such an API to implement an automated reception system for its residents or guests, or other businesses which allocate keys to different individuals at different times (such as a movie theatre or a trucking company, for example) may utilize such an API to provide a key management system to manage their key logistics.

In some embodiments, individual users may opt to allow the system to generate access rules automatically (or the system may be configured to automatically generate access rules). For example, the system may include a booking function that a person may wish to allow the system to automatically generate rules which will allow service providers to access a property in response to service requests from the user. For example, key sets may be made available automatically to approved providers of cleaning, shopping, delivery, repair or other services, requested by the user. As another example, property-booking companies, such as rental car companies or rental home companies, may build a system where access rules are generated automatically or for approval by the administrative user based on booking data as bookings occur.

In addition to individual service requests, ongoing service requests might be fulfilled. As a non-limiting example, the key exchange service might provide users with the option to have packages delivered to a virtual address. Such packages may then be delivered into the user's home by delivery personnel who are automatically given access to the user's key upon arrival of a package. The authorization may be for a limited period of time. The system may provide an automatic warning if the key set is not returned in a timely fashion.

In some embodiments, key sets in the key bins may be periodically scanned by a client device by personnel at the key exchange center or an embedded sensor in the bin to update the key exchange system's inventory of key sets. Each bin may have scannable identifiers indicating that bin's identity so that the scan detects either or both of a key identifier and a bin identifier. Such periodic inventory scans would control for human error or interference with the key placements, detect security breaches, provide updated location data for publication to user's accounts or inventory confirmation for key administrators' peace of mind.

In some embodiments the system may provide a booking service that allows guest users to make reservations for accessing different properties. Some users may wish to allow the system to automatically generate rules to allow guest users who have booked their properties to access keysets for the booked properties during the booked time period. The system may be configured to automatically generate such rules.

In some embodiments the system includes calendars and other tools for managing property bookings. Users who are key administrators may use such features to manage and aggregate access scheduling into a single system (even if those users source guests in a way that is outside of the system).

It can be appreciated that the systems described herein may be applied in support of a range of different business models. The systems may supply specific features to support these business models. For example, in some embodiments an owner or other person who wishes to pass a key set to some other person may pay for such use of the system. In such embodiments the system may collect a payment from the owner (e.g. a credit card payment bank transfer, debit card payment etc.) prior to allowing the owner to drop off a key set to be exchanged. In the alternative, the system may automatically bill the owner before or after the exchange of a key set has occurred. Such payment or billing may be a flat rate or may be based on particulars of the key exchange (such as how long was the key held before it was picked up by the intended recipient). Where billing is based on particulars of the key exchange the system may automatically monitor such particulars.

In some embodiments, users of the system may pay for access to the system (e.g. on a subscription basis). In some cases users may pay a fee to be entitled to be key administrators. The fee may be in the form of a subscription, for a period of time for example. The system may automatically bill users and may refuse to accept key sets for exchange from users who have not paid the appropriate fees up to date.

A system as described herein may optionally be configured to deliver advertising or coupons to users of the system. For example, the system may deliver to all or selected key recipients advertisements and/or coupons for businesses local to the property to which the key set relates (which will typically also be local to the key exchange location). The system may deliver offers of event tickets for events occurring around the time of the key exchange in the city or town where the key exchange location is situated or in the surrounding area.

A system as described herein may incorporate or be associated with a booking system which permits persons to book access to properties and pay for such property access. The system may include a charge for key exchanges.

In some embodiments, the system may be configured to support provision of and/or billing for value added services provided by the businesses managing the key exchange centers and incorporated into the key exchange service's booking and payment systems. As non-limiting examples, options could be provided to the key administrator for the key exchange center to check or scan a guest's ID before release of a key, for the pre-purchase of food and beverage items (e.g. at a key exchange center that is a café) for a guest to collect upon arrival, or for handling of after business hours key pickups by placement of a designated key into lockbox outside the business location. Further, tools could be introduced to track service level and activity, such as user satisfaction, frequency of key inventory scans, average key pickup times, amount customers spend on value added services, and the like.

In some embodiments, the key identifier could be associated with vouchers purchased by the key administrator for use at the businesses managing the key exchange centers or other businesses added to the network to accept such vouchers. The vouchers might be purchased by the key administrator for use by a guest, such as a traveler, to enhance their travel experience. For example, a key administrator might purchase a dollar amount or some number of food and beverage items to a local café, tickets to a local attraction, or the like and associate them with a particular key set and/or guest for utilization during their stay. Such vouchers might be redeemed upon a client device scanning the key token and the key exchange server receiving the key identifier, checking for vouchers, and transmitting to the client device that certain vouchers are available for redemption at the location.

In different embodiments, payments may take various forms, triggered by various events. The key administrator may pay per use of the key exchange system in which case they are billed for each pickup and/or drop off of a key set. Such billings might include "overnight fees" to align billings with time-based utilization of the key exchange infrastructure. Alternatively, recurring subscription fees could be paid for package use. Payments could be linked to different events in the system such as bookings, value added service or voucher purchases, service requests, guest booking of a property, the drop off or pickup of keys, or the like.

In some embodiments, the system is configured to permit key administrators to co-manage other properties through the key exchange system which rely on access technologies other than physical keys, or to transition a property in the key exchange system from keys to a digital lock technology. In such cases, the key exchange system may support such property additions and transitions by, a) providing system integrated digital locks which may be seamlessly substituted for a system that relies on exchanging physical keys b) integrating its booking system with other digital lock providers (e.g. through an API), or c) in the case of a digital lock provider which does not or refuses to provide an integration point, allowing key administrators to store a digital key (e.g. such as in the form of a low cost mobile device) with access rights to the digital lock at the key exchange centers. Embodiments that are cross-platform and technology agnostic can provide guest users and authorized service providers with access to a wide range of properties in a safe and controlled manner.

The foregoing are only non-limiting examples of features that may be incorporated into a system as described herein for the purpose of supporting various business functions.

Where a component (e.g. a server, client device, database, software module, processor, program memory, key, key chain, key cabinet, bin, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

While a number of exemplary aspects and embodiments have been discussed above, those of skill in the art will recognize certain modifications, permutations, additions and sub-combinations thereof. For example:

In the embodiments described herein, the key identifier is encoded onto a key chain attached to a key or key set. In other embodiments, the key identifier may be encoded on some other object attached to a key, or even directly on the key itself.

In particular embodiments a unique serial number may be printed or engraved on each key chain used in the key exchange network. The serial number may be linked to the key's unique key identifier, so that it can be used to identify the key (as an alternative to scanning the key chain). The serial number could be used, for example, if NFC-enabled devices are not available, or in situations where it is more convenient to perform a visual inspection of the key chain to identify the key.

In the illustrated embodiment of FIG. 1, key exchange server 108 includes a user credentials database 131, an administrative users database 132, a key inventory database 133, and an access rules database 134. It is not necessary that such databases reside on key exchange server 108 as shown. In other embodiments one or more of these databases may be provided in another server or storage device accessible to key exchange server 108.

It is therefore intended that the scope of the following appended claims and claims hereafter introduced should not be limited by the embodiments set forth in the examples, but should be given the broadest interpretation consistent with the description as a whole.

What is claimed is:

1. A method of facilitating exchange of a key set comprising one or more keys at a key access location, the method comprising:
   scanning a key token attached to the key set to obtain a unique key identifier; identifying the key access location; assigning the key set to a bin at the key access location; and associating the bin and the key access location with the key identifier;
   receiving an access rule for the key set wherein the access rule identifies an authorized party;
   publishing the key access location to the authorized party;
   receiving an access request for the key set from the authorized party through a client device, the access request providing user credentials;
   authenticating the access request by verifying the user credentials provided in the access request against a set of credentials associated with the authorized party; and
   when the access request is authenticated, transmitting an access instruction for presentation of the key set.

2. A method according to claim 1 comprising determining a location of the client device wherein authenticating the access request further comprises comparing the location of the client device with the key access location associated with the key identifier.

3. A method according to claim 1 comprising identifying the key access location by receiving from the client device one or more of: Global Positioning System (GPS) data, mobile network location data, device identity data, a physical interaction with the device, and user data input.

4. A method according to claim 1 comprising identifying the location of the client device by receiving from the client device one or more of: GPS data, mobile network location data, device identity data, a physical interaction with the device, and user data input.

5. A method according to claim 1 wherein the access rule comprises an authorized access period, the method comprises identifying a time of the access request and authenticating the access request comprises comparing the time of the access request with the authorized access period.

6. A method according to claim 1 comprising receiving a plurality of access rules for the key set, wherein each one of the access rules identifies an authorized party and a corresponding authorized access period.

7. A method according to claim 6 comprising publishing the key access location to each one of the authorized parties within a predetermined time of the corresponding authorized access period.

8. A method according to claim 1 comprising verifying presentation of the correct key set by initiating a scan of the key token at the key access location.

9. A method according to claim 1 wherein transmitting the access instruction for presentation of the key set comprises transmitting the bin associated with the key set to the client device.

10. A method according to claim 1 wherein the bin is controllable by a control and processing unit, and transmitting the access instruction for presentation of the key set comprises transmitting a signal to the control and processing unit to cause the key set to be made accessible.

11. A method according to claim 1 comprising verifying that the requested key set is in the bin by activating a scanner in the bin to read the key identifier of the key set from the key token.

12. A method according to claim 1 wherein the key identifier comprises a Uniform Resource Locator (URL).

13. A method according to claim 12 wherein the URL is linked to unique identification information assigned to the key set.

14. A method according to claim 13 wherein the identification information comprises a number, name or other alphanumeric string.

15. A method according to claim 1 wherein the key identifier is encoded on the keychain attached to the key set.

16. A method according to claim 15 wherein the key identifier is encoded in a Near-Field Communication (NFC) tag on the keychain.

17. A method according to claim 1 comprising periodically scanning key tokens of key sets at one or more key exchange locations and updating the associations of key identifiers with bins and the key access locations based on the information from the periodic scans.

18. A method according to claim 1 wherein publishing the key access location to the authorized party comprises sending the key access location to a user account page or email account accessible by the authorized party.

19. A method according to claim 1 comprising automatically generating a notification to a user associated with the key set in response to one or more of: the key set being presented to the authorized party and the key set being dropped off at a key access location.

20. A method according to claim 1 comprising automatically generating a notification to a user associated with the key set if the key set has not been presented to the authorized party by a specified time.

21. A method according to claim 5 comprising automatically generating a notification to the authorized party a predetermined time prior to expiry of the access period.

22. A method according to claim 1 comprising automatically generating a notification to the authorized party in response to the key set being presented to the authorized party.

23. A method according to claim 22 comprising receiving content for the notification to the authorized party from an administrative user associated with the key set and including the content in the notification to the authorized party.

24. A method according to claim 1 comprising automatically providing to the authorized party one or more pre-purchased items, coupons or other offers for goods or services local to the key exchange location.

25. A method according to claim 1 comprising automatically generating the access rule in response to one or more of: a user request for a service in a home, a property booking, a recurring access request, and a request by a third party system authorized to make requests of the key exchange service.

26. A system for facilitating asynchronous exchange of a key set comprising one or more keys at one of a plurality of key access locations, the system comprising a key exchange server configured to:
   receive a unique key identifier encoded on a key token attached to the key;
   determine the key access location;
   assign to the key set a bin at the key access location;

associate the bin and the key access location with the key identifier;

receive or generate an access rule for the key set, wherein the access rule identifies an authorized party;

publish the key access location to the authorized party;

receive an access request for the key set from the authorized party through the client device, the access request providing user credentials;

authenticate the access request by verifying the user credentials provided in the access request against a set of credentials associated with the authorized party; and when the access request is authenticated, transmit an access instruction for presentation of the key set to the authorized party.

27. Apparatus according to claim 26 wherein the key access server is configured to determine a location of the client device and to authenticate the access request by steps including comparing a location of the client device with the key access location associated with the key identifier.

28. Apparatus according to claim 26 wherein the key access server is configured to identify the key access location by receiving from the client device one or more of: GPS data, mobile network location data, device identity data, a physical interaction with the device, and user data input.

29. Apparatus according to claim 26 wherein the key access server is configured to identify the location of the client device by receiving from the client device one or more of: GPS data, mobile network location data, device identity data, a physical interaction with the device, and user data input.

30. Apparatus according to claim 26 wherein the access rule comprises an authorized access period and the key access server is configured to identify a time of the access request and to authenticate the access request by steps comprising comparing the time of the access request with the authorized access period.

31. Apparatus according to claim 26 wherein the key access server is configured to receive or generate a plurality of access rules for the key set, wherein each one of the access rules identifies an authorized party and a corresponding authorized access period.

32. Apparatus according to claim 26 wherein the key access server is configured to publish the key access location to each one of the authorized parties within a predetermined time of the corresponding authorized access period.

33. Apparatus according to claim 26 comprising a key cabinet subsystem comprising a plurality of bins at the key access location.

34. Apparatus according to claim 33 wherein each one of the plurality of bins is adapted to receive one key and key chain combination.

35. Apparatus according to claim 33 wherein the key cabinet subsystem comprises a control and processing unit and the key exchange server is configured to transmit an access instruction for presentation of the key set by transmitting a signal to the control and processing unit to cause the key set to be made accessible to the authorized party.

36. Apparatus according to claim 34 wherein the key cabinet subsystem comprises a scanner in the bin, wherein the key exchange server is configured to transmit a signal to the control and processing unit causing the scanner to be activated to read the key identifier of the key set to verify that the requested key set is in the bin.

37. Apparatus according to claim 26 wherein the key exchange server is configured to receive the key identifier from a scan of the key set and to verify from the key identifier that the key set to be presented to the authorized party is the correct key set.

38. Apparatus according to claim 26 wherein the key exchange server is configured to transmit an access instruction for presentation of the key by transmitting the bin associated with the key set to the client device.

39. Apparatus according to claim 26 wherein the key identifier associated with the key set comprises a URL.

40. Apparatus according to claim 39 wherein the key identifier is linked to unique identification information visible on a key chain.

41. Apparatus according to claim 26 wherein the key token is located on a keychain attached to the key set.

42. Apparatus according to claim 26 wherein the key identifier is encoded in an NFC tag.

43. Apparatus according to claim 41 wherein the NFC tag is embedded in a recess in a metal fob.

44. Apparatus according to claim 43 wherein the NFC tag is separated from the metal of the fob by an anti-metal layer and is secured in the metal recess by an epoxy layer.

45. Apparatus according to claim 26 wherein the key exchange server is configured to process a plurality of access rules for the key set, wherein each one of the access rules identifies an authorized party and a corresponding authorized access period.

46. Apparatus according to claim 45 wherein the key exchange server is configured to publish the key access location to each one of the authorized parties within a predetermined time of the corresponding authorized access period.

47. Apparatus according to claim 26 wherein the key exchange server is configured to periodically trigger scanning of key tokens of key sets at one or more key exchange locations and to update the associations of key identifiers with bins and the key access locations based on the information from the periodic scans.

48. Apparatus according to claim 26 wherein the key exchange server is configured to publish the key access location to the authorized party by sending the key access location to a user account page or email account accessible by the authorized party.

49. Apparatus according to claim 26 comprising a notification generator configured to generate notifications to a user associated with the key set in response to one or more of: the key set being presented to the authorized party and the key set being dropped off at a key access location.

50. Apparatus according to claim 49 wherein the notification generator is configured to automatically generate a notification to the user associated with the key set if the key set has not been presented to the authorized party by a specified time.

51. Apparatus according to claim 30 comprising a notification generator configured to generate notifications wherein the notification generator is configured to automatically generate a notification to the authorized party a predetermined time prior to expiry of the access period.

52. Apparatus according to claim 26 wherein the key exchange server comprises a notification generator configured to automatically generate a notification to the authorized party in response to the key set being presented to the authorized party.

53. Apparatus according to claim 52 wherein the key exchange server is configured to receive and store content for the notification to the authorized party from an administrative user associated with the key set and to include the content in the notification to the authorized party.

54. Apparatus according to claim 26 wherein the key exchange server is configured to automatically provide to the authorized party one or more pre-purchased items, coupons or other offers for goods or services local to the key exchange location.

55. Apparatus according to claim 26 wherein the key exchange server is configured to generate access rules from system requests following one or more of: a user request for a service in a home, a property booking, a recurring access request, and a request by a third party system authorized to make requests of the key exchange service.

56. Apparatus according to claim 33 wherein the key exchange server is configured to cause an interface application to be downloaded to the key cabinet subsystem, the interface application comprising instructions for enabling the key cabinet subsystem to interface with the key exchange server.

57. Apparatus according to claim 56 wherein the key exchange server is configured to cause updates to the interface application to be downloaded to the key cabinet subsystem.

58. Apparatus according to claim 33 wherein the key exchange server is configured to monitor a status of the key cabinet subsystem.

59. A method of facilitating exchange of a key set comprising one or more keys at a key access location, the method comprising:
- receiving a unique key identifier encoded on a key token attached to the key set;
- determining the key access location;
- assigning to the key set a bin at the key access location;
- associating the bin and the key access location with the key identifier;
- publishing the key access location to an authorized party;
- receiving an access request for the key set from the authorized party through a client device, the access request providing user credentials;
- obtaining an access rule associated with the key set, wherein the access rule identifies an authorized access period for the authorized party;
- authenticating the access request by verifying the user credentials provided in the access request against a set of credentials associated with the authorized party and verifying that the access request is made within the authorized access period; and
- when the access request is authenticated, transmitting an access instruction to a key cabinet controller to unlock the bin.

\* \* \* \* \*